(12) United States Patent
Vangeel et al.

(10) Patent No.: US 10,063,388 B2
(45) Date of Patent: Aug. 28, 2018

(54) LIGHTING-CONTROL PROCESSOR AND METHOD FOR OPERATING A LIGHTING-CONTROL PROCESSOR

(71) Applicant: PHILIPS LIGHTING HOLDING B.V., Eindhoven (NL)

(72) Inventors: Jurgen Mario Vangeel, Beerse (BE); John André Van Beurden, Tilburg (NL); Robbert Martinus Andreas Driessen, Hegelsom (NL); Wijnand Johannes Rietman, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/568,083

(22) PCT Filed: Apr. 4, 2016

(86) PCT No.: PCT/EP2016/057339
§ 371 (c)(1),
(2) Date: Oct. 20, 2017

(87) PCT Pub. No.: WO2016/169755
PCT Pub. Date: Oct. 27, 2016

(65) Prior Publication Data
US 2018/0145846 A1 May 24, 2018

(30) Foreign Application Priority Data
Apr. 21, 2015 (EP) .................................... 15164480

(51) Int. Cl.
*H01J 1/60* (2006.01)
*H01J 7/42* (2006.01)
(Continued)

(52) U.S. Cl.
CPC .......... *H04L 12/2827* (2013.01); *G06F 11/07* (2013.01); *H02J 9/02* (2013.01);
(Continued)

(58) Field of Classification Search
None
See application file for complete search history.

(56) References Cited

U.S. PATENT DOCUMENTS

| 4,945,280 A * | 7/1990 | Beghelli ................. G08B 7/062 315/129 |
| 7,170,238 B2 * | 1/2007 | Adamson ........... H05B 37/0245 315/293 |

(Continued)

FOREIGN PATENT DOCUMENTS

| EP | 1176568 A2 | 1/2002 |
| WO | 2010095087 A1 | 8/2010 |

*Primary Examiner* — Anh Tran
(74) *Attorney, Agent, or Firm* — Meenakshy Chakravorty (57) ABSTRACT

A lighting-control processor (100, 300) for controlling operation of an external lighting unit comprises an exchange control unit, which is configured to control exchange of lighting-control information with the lighting unit via a lighting-control interface in accordance with an exchange protocol and to generate and provide exchange monitoring information indicative of an operational status of the exchange control unit. A reset unit is configured to receive a soft-reset command and to cause a soft reset of the lighting-control processor upon receiving the soft-reset command. An exchange watchdog unit is configured to receive the exchange monitoring information, determine validity of the exchange monitoring information in accordance with a predefined validity criterion, and to provide the soft-reset command upon detecting that the received exchange monitoring information is not valid.

15 Claims, 5 Drawing Sheets

(51) Int. Cl.
  *H05B 37/04* (2006.01)
  *H04L 12/28* (2006.01)
  *G06F 11/07* (2006.01)
  *H02J 9/02* (2006.01)
  *H05B 37/02* (2006.01)

(52) U.S. Cl.
  CPC ....... *H04L 12/283* (2013.01); *H05B 37/0272* (2013.01); *H04L 2012/285* (2013.01)

(56) References Cited

U.S. PATENT DOCUMENTS

2010/0323034 A1  12/2010  Tanigawara et al.
2012/0158161 A1   6/2012  Cohn et al.

\* cited by examiner

FIG. 5

LIGHTING-CONTROL PROCESSOR AND METHOD FOR OPERATING A LIGHTING-CONTROL PROCESSOR

CROSS-REFERENCE TO PRIOR APPLICATIONS

This application is the U.S. National Phase application under 35 U.S.C. § 371 of International Application No. PCT/EP2016/057339, filed on Apr. 4, 2016, which claims the benefit of European Patent Application No. 15164480.4, filed on Apr. 21, 2015. These applications are hereby incorporated by reference herein.

FIELD OF THE INVENTION

The present invention relates to a lighting-control processor for controlling operation of an external lighting unit, to a luminaire, to a method for operating a lighting-control processor, to a method for controlling operation of a luminaire, and to a computer program for controlling a lighting-control processor in controlling operation of an external lighting unit.

BACKGROUND OF THE INVENTION

WO 2010/095087 A1 describes a control system for a lighting-control network. The control system comprises a controlled device controlled by a controller having receiving means for receiving command signals, and having a first, second and third storage location for storing a personal ID or address, network ID and the ID of a remote control device, respectively. The control system further comprises at least one user-operable remote control device, designed for transmitting command signals. A command signal comprises a target address code, a network ID code, a sender address code and a command code. Normally, the controller only responds to control signals if target address code, network ID code, and sender address code match with the information in memory. The controller is capable of operating in a "No Network" mode, in which the controller responds to a reset command irrespective of target address code, the network ID code and the sender address code. Luminaires that comprise at least one lighting unit for generating light and a lighting-control processor for controlling operation of the at least one lighting unit have become more and more complex. This is related to an increasing level of intelligent operation enabled by the use of one or more sensors and the use of a microcontroller as the lighting-control processor. The lighting-control processor is typically configured to execute an implemented logic and has exchange means to interface with other devices in a given network, such as an area controller or other luminaires, in particular neighbor luminaires. With an increasing level of intelligence executed by the lighting-control processor, susceptibility for failure also increases.

US 2012/0158161 A1 discloses a single controller platform for controlling and monitoring security, home automation, and monitoring devices. The controller platform further provides for a rules-based response to receiving sensor events, including causing actions to be performed by the controller platform or to cause actions to be performed by sensor devices. An example of a microkernel operating system usable by embodiments is a QNX real-time operating system. Under such a micro-kernel operating system, drivers, applications, protocol stacks and file systems run outside the operating system kernel in a memory-protected user space. Such a microkernel operating system is described to provide fault resilience through features such as critical process monitoring and adaptive partitioning. It is described as a result that components can fail, including low-level drivers, and automatically restart without affecting other components or the kernel and without requiring a reboot of the system, and that a critical process monitoring feature can automatically restart failed components because those components function in the user space.

SUMMARY OF THE INVENTION

According to a first aspect of the invention, a lighting-control processor for controlling operation of an external lighting unit is provided. The lighting-control processor comprises
  an exchange control unit, which is configured
    to control exchange of lighting-control information with the lighting unit via a lighting-control interface in accordance with an exchange protocol; and
    to generate and provide exchange monitoring information indicative of an operational status of the exchange control unit;
  a reset unit, which is configured to receive a soft-reset command and to cause a soft reset of the lighting-control processor upon receiving the soft-reset command, the soft reset being a reset process under maintained provision of supply power to the lighting control processor and any device connected to the lighting-control processor; and
  an exchange watchdog unit, which is configured to receive the exchange monitoring information, determine validity of the exchange monitoring information in accordance with a predefined validity criterion, and to provide the soft-reset command upon detecting that the received exchange monitoring information is not valid.

The lighting-control processor of the first aspect of the present invention achieves a failure management that allows maintaining operation of the external lighting unit and other external devices controlled by the lighting-control processor in case failure occurs in the course of exchange of lighting-control information between the lighting-control processor and the external lighting unit. To this end, the lighting-control processor comprises an exchange watchdog unit that monitors the operation of the exchange control unit. The exchange control unit of the lighting-control processor of the first aspect of the present invention is configured to control exchange of lighting-control information with the lighting unit via a lighting-control interface in accordance with an exchange protocol. This may for instance include adding one or more adequate protocol headers in accordance with the exchange protocol to form lighting-control information messages for sending the lighting-control information to an external lighting unit, or removing such protocol headers from received lighting-control information messages. In particular, the exchange control unit is configured to generate and provide exchange monitoring information indicative of an operational status of the exchange control unit.

The exchange watchdog unit is configured to receive such exchange monitoring information and to determine validity of the exchange monitoring information in accordance with a predefined validity criterion. Upon detecting that the received exchange monitoring information is not valid in accordance with the validity criterion, the exchange watchdog unit is configured to provide a soft-reset command that is received by the reset unit. The reset unit, upon receiving the soft-reset command, is configured to cause a soft-reset of the lighting-control processor. A soft-reset in the present context forms a reset process of the lighting-control processor, during which all connected devices (e.g. sensors) remain powered. In particular, no power cycle is performed effecting the operation of connected devices such as sensors. Rather, during a soft-reset, such devices remain powered.

In the following, embodiments of the lighting-control processor of the first aspect of the invention will be described.

In one embodiment, the exchange watchdog unit is configured to determine validity of the received exchange monitoring information by comparing the received exchange monitoring information with predefined template monitoring information, and to provide the soft-reset command if the received exchange monitoring information differs from the template monitoring information. The predefined template monitoring information can take different forms in different embodiments. In one embodiment, the template monitoring information forms an acknowledgement of correct receipt of lighting-control information exchanged via the lighting-control interface in accordance with the exchange protocol. Thus, in this embodiment, the exchange watchdog unit verifies correct receipt of the exchanged lighting-control information. In another embodiment, the template monitoring information is formed by version information related to the exchange protocol implemented by the exchange control unit. Such exchange monitoring information comprises in one variant version information of software run by the exchange control unit. Since different software components may relate to different components of the exchange control unit, one such embodiment comprises providing all version information, which means that a set of version information related to all software components forms (or is comprised by) the exchange monitoring information In one embodiment, the exchange watchdog unit is additionally configured to provide a watchdog trigger signal, and the exchange control unit is configured to receive the exchange watchdog trigger signal and to generate and provide the exchange monitoring information in response to receiving the exchange watchdog trigger signal. The present embodiment allows performing a watchdog protocol. In one variant, the watchdog unit is configured to repeat providing the watchdog trigger signal to the exchange control unit in absence of exchange monitoring information for a predefined time span. Such repetition may be limited to a preset number of cycles, before the soft-reset command is provided by the exchange watchdog unit. In another variant, the exchange watchdog unit is additionally configured to provide the soft-reset command in absence of received exchange monitoring information after lapse of a predefined timeout time span measured from providing the exchange watchdog trigger signal.

In another embodiment, the exchange control unit is configured to control the exchange of the lighting-control information via the lighting-control interface in accordance with an Internet Protocol stack. This embodiment is preferred for the use in luminaires for lighting networks, for instance using a power-over Ethernet technology. The Internet Protocol stack preferably comprises protocol layers related to the layers 2 to 4 according to the OSI reference model.

In some embodiments, the exchange watchdog unit provides a watchdog service that remains internal with respect to the lighting-control processor. In other words, it is only the correct functioning of internal units of the lighting-control processor, in particular of the exchange control unit, that is supervised by the exchange watchdog unit. In other embodiments, the lighting-control processor preferably has an exchange watchdog unit that is additionally configured to provide the watchdog trigger signal via the lighting-control interface to a gateway server, which is external to the lighting-control processor, and to receive the gateway exchange monitoring information, determine validity of the gateway exchange monitoring information in accordance with a predefined validity criterion, and to provide the soft-reset command upon detecting that the received gateway exchange monitoring information is not valid. In this embodiment, the exchange watchdog unit of the lighting-control processor thus requests and receives another type of exchange monitoring information in the form of gateway exchange monitoring information from an external gateway server, which is external to the lighting-control processor. Correct reception of the gateway exchange monitoring information for example provides information about whether an IP stack implemented in the lighting-control processor is running correctly. By also involving other network devices in the watchdog procedure, the lighting-control processor can additionally use the response of such external network devices to monitor correct operation of the lighting-control processor, and in particular its exchange-control unit. This embodiment is advantageous because it involves another network device, in particular the external gateway server, for the purpose of generating and providing exchange monitoring information. This allows detecting additional errors in a configuration which only become apparent when physically sending a message over the network, in comparison with only sending the message internally over a (virtual) software bus. In a variant, in addition to or instead of the external gateway server, other external luminaires having a lighting-control processor of their own are used for monitoring the exchange.

Preferably, in such embodiments that additionally use the gateway exchange monitoring information, this information is provided less frequently than the exchange monitoring information indicative of an operational status of the exchange control unit. In particular, the exchange watchdog unit is preferably configured to provide the watchdog trigger signal via the lighting-control interface to the gateway server less frequently than to provide the watchdog trigger signal for internal reception by the internal exchange monitoring unit. This embodiment, which may be called a mixed mode watchdog mechanism, helps keeping the overhead used for monitoring at a low level, overhead meaning in the present context in particular those fractions of the network traffic, which are not directly concerned with lighting control.

According to a second aspect of the present invention, a luminaire is provided comprising at least one lighting unit for generating light and a lighting-control processor according to the first aspect of the present invention or one of its embodiments, for controlling operation of the at least one lighting unit.

The luminaire shares the advantages of the lighting-control processor of the first aspect of the invention. In particular, the luminaire of the second aspect of the present invention is provided with a reset mechanism that makes sure that the luminaire returns to an operating mode in case of failure, without requiring a reset of any depending devices, such as a sensor, for instance an occupancy sensor that is powered by the luminaire.

Accordingly, in a preferred embodiment, the luminaire of the second aspect of the present invention further comprises a supply-power unit, which is connected to the lighting-control processor and which is configured to deliver electrical DC supply power to at least one electrical device including the at least one lighting unit via a plug-in power interface. In this embodiment, the reset unit is configured, when causing the soft reset of the lighting-control processor upon receiving the soft-reset command, to control operation of the supply-power unit so as to keep up delivery of the supply power via the power interface.

In a variant of this embodiment, the luminaire further comprises a sensor unit, which receives the supply power via the power interface and includes a random-access memory that is configured to lose stored information when reception of the supply power is interrupted. In one example, the sensor unit is formed by an occupancy sensor configured to determine the presence of a person in a room, for instance by detecting motion.

Another example is a vacancy sensor allowing to automatically turn the lighting unit off when a room is vacant, for instance by no longer detecting motion in the room. Such sensors rely on a random-access memory for correct assessment of the current state.

In a further embodiment of the luminaire, the reset unit is additionally configured to receive a hard-reset command and to cause a hard reset of the lighting-control processor upon receiving the hard-reset command. The luminaire is configured to not receive the hard-reset command and the soft-reset command by external user input. The present embodiment of the luminaire allows achieving a particularly small form factor because means for an external user input by manual reset can be omitted. In other words, the luminaire of this embodiment does not provide any reset button or the like to reset the lighting-control processor of the luminaire.

According to a third aspect of the present invention, a method for operating a lighting-control processor in controlling operation of an external lighting unit is provided. The method comprises a method for operating a lighting-control processor in controlling operation of an external lighting unit, the method comprising an exchange control process, comprising
controlling exchange of lighting-control information with the lighting unit via a lighting-control interface in accordance with an exchange protocol; and
generating and providing exchange monitoring information indicative of an operational status of the exchange control unit;
a reset control process, comprising
receiving a soft-reset command; and
causing a soft reset of the lighting-control processor upon receiving the soft-reset command, the soft reset being a reset process under maintained provision of supply power to the lighting control processor and any device connected to the lighting-control processor and
an exchange watchdog process, comprising
receiving the exchange monitoring information;
determining validity of the exchange monitoring information in accordance with a predefined validity criterion; and
providing the soft-reset command to the reset control process upon detecting that the received exchange monitoring information is not valid.

The method of the third aspect of the invention shares the advantages of the lighting-control processor of the first aspect of the first aspect of the present invention.

In one embodiment of the method,
the exchange watchdog process further comprises providing a watchdog trigger signal to the exchange control process; and
the exchange control processes further comprises receiving the exchange watchdog trigger signal and, in response to receiving the exchange watchdog trigger signal, providing the exchange monitoring information.

According a forth aspect of the present invention, a method for controlling operation of a luminaire comprises
providing a luminaire comprising at least one lighting unit for generating light and a lighting-control processor for controlling operation of the at least one lighting unit;
the lighting-control processor controlling operation of the lighting unit of the luminaire in accordance with the method of the third aspect of the invention or one of its embodiments.

In one embodiment, the method for controlling operation of a luminaire further comprises
delivering electrical DC supply power from a supply-power unit, which is connected to the lighting-control processor, to at least one electrical device including the at least one lighting unit via a plug-in power interface; and
when causing the soft reset of the lighting-control processor upon receiving the soft-reset command, controlling operation of the supply-power unit so as to keep up delivery of the supply power via the power interface.

According to a fifth aspect of the present invention, a computer program for controlling a lighting-control processor in controlling operation of an external lighting unit is provided. The computer program comprises program code for causing the lighting-control processor to carry out the method as defined in accordance with the third aspect of the present invention, when the computer program is run on the lighting-control processor.

It shall be understood that the lighting-control processor of claim 1, the luminaire of claim 7, the method for operating a lighting-control processor according to claim 11, the method for operating a luminaire according to claim 13, and the computer program for determining a parameter of a heat sink of claim 14 and the computer program for controlling a lighting-control processor in controlling operation of an external lighting unit of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

It shall be understood that the lighting-control processor of claim 1, the luminaire of claim 7, the method for operating a lighting-control processor according to claim 11, the method for operating a luminaire according to claim 13, and the computer program for determining a parameter of a heat sink of claim 14 and the computer program for controlling a lighting-control processor in controlling operation of an external lighting unit of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
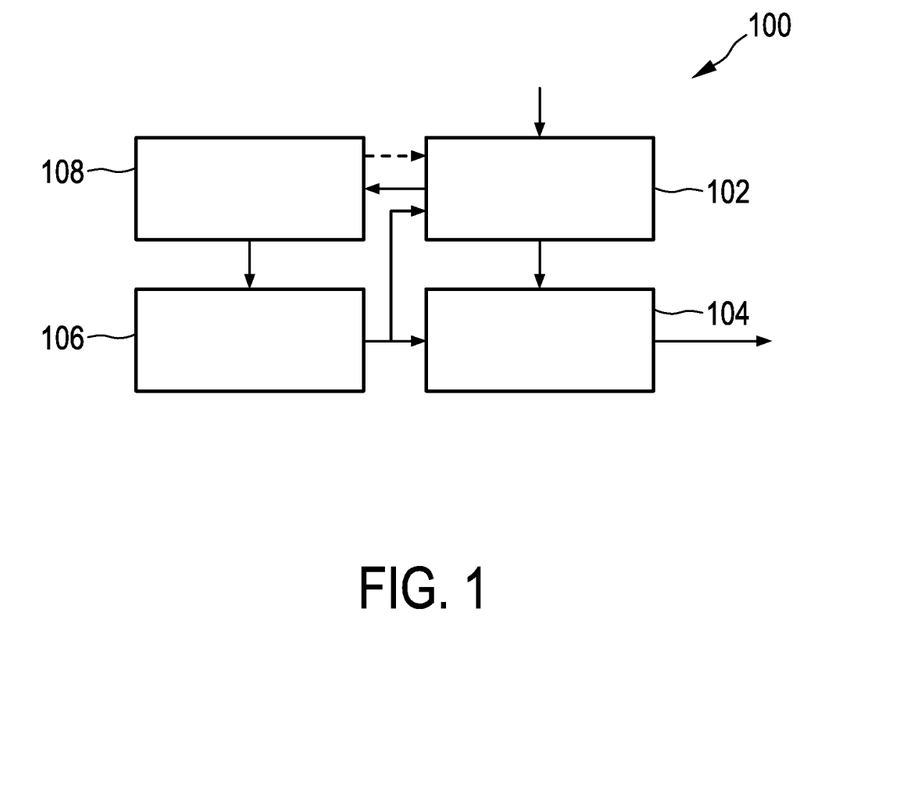
FIG. 1 is a block diagram of a first embodiment of a lighting-control processor.

FIG. 1 is a block diagram of an embodiment of a lighting-control processor 100. The lighting-control processor 100 is configured for controlling operation of one or more lighting units (not shown in FIG. 1), which from the perspective of the lighting-control processor are external devices. The lighting-control processor 100 is implemented in some embodiments by a microcontroller. An example of a suitable microcontroller is a 32-bit Flash microcontroller, such as a microcontroller of the type STM32 by ST microelectronics.

The lighting-control processor 100 thus serves for exchanging lighting-control information of various types with a lighting unit that is controlled by the lighting-control processor. The exchange is performed under control of an exchange-control unit 102. The exchange-control unit receives control information such as operational commands, requests for providing information and the like for a one-way or two-way exchange between an external lighting unit and a lighting-control unit. The lighting-control unit may thus form, in different variants, an internal or external unit with respect to the lighting-control processor. In many embodiments, the lighting-control unit is integrated with the lighting-control processor in a single processor device. However, the lighting-control processor may also form Various parameters of light emission by the one or more lighting units can be controlled using the lighting-control information. As an example, the lighting-control information may serve for controlling an intensity of light emitted by a given lighting unit, including switching between an on and an off state of the lighting unit. As another example, the lighting-control information may serve for controlling a color of light emitted by a given lighting unit. As another example, the lighting-control information may serve for controlling a modulation of an emitted light intensity. Lighting-control information may also include status information on an operational status of the lighting unit, such as an applied voltage, a determined current amplitude, a temperature, or information on a detected operational defect.

For exchanging the lighting-control information with the external lighting unit, a specific lighting-control protocol is typically implemented. The lighting-control protocol includes an exchange protocol. The exchange protocol specifies how lighting-control information is communicated between the lighting-control processor and the lighting unit. For controlling the exchange according to the exchange protocol, the lighting-control processor 100 comprises an exchange control unit 102. The exchange control unit 102 is configured to control exchange of lighting-control information with the lighting unit via a lighting-control interface 104 in accordance with the exchange protocol. Many exchange protocols are known in the art and can be used in the present context to form various embodiments. An example of an exchange protocol is the Internet Protocol (IP); another example is a combination of the Transmission Control Protocol on top the Internet Protocol (known as TCP/IP). TCP/IP is a well-known protocol suite used in most computer networks for exchanging data. TCP/IP provides a set of standards to specify how computers communicate with each other. Furthermore TCP/IP defines how different networks are connected and how data is routed through gateway servers, routers, bridges and other types of network nodes.

More generally, in terms of the well-known OSI model of network communication, the exchange protocol specifies rules for exchange on any of the layers 3 and higher. Any protocol or protocol suite that is suitable for exchanging lighting-control information on layers 3 and higher can be used for implementation of the lighting-control processor 100.

The lighting-control interface can be provided in one of many different ways and provides for communication via layers 1 and 2 according to the OSI model. In one variant, the lighting control interface is provided in the form of a plug-and-socket type interface. For instance, an RJ45 connector interface can be used to establish an Ethernet or a Power-over-Ethernet connection between the lighting-control processor and one or more lighting units. The lighting-control interface 104 can also be implemented as a wireless interface of any known type, including an RF interface such as WIFI (WLAN, WPAN), ZigBee, and Bluetooth. In other embodiments, in which the lighting-control processor is integrated in a housing that also comprises one or more lighting units, the lighting-control interface may be implemented as any type of wired connection.

The exchange-control unit 102 is also configured to provide exchange monitoring information indicative of an operational status of the exchange control unit. Such monitoring information comprises in some embodiments exchange status information concerning a status of operation of the exchange-control unit. As an example, the exchange status information may comprise information on a detected absence of a timely response from a lighting unit to a certain message, such as a command or request provided by the lighting-control processor under control of the exchange-control unit. In another example, sending and verification of correct receipt of a message according to the exchange protocol is monitored, and corresponding monitoring information is generated. The monitoring information is in another embodiment formed by a number of repetitions of a transmission of a command to a particular lighting unit. Furthermore, the exchange monitoring information may include information regarding verified continued operation of the operating system (OS) of the exchange control unit or of the lighting-control processor as a whole.

Another embodiment includes the provision of monitoring in the form of version information indicative of an implemented version of the exchange protocol.

As a specific example, such information may for instance be obtained by the exchange control unit by issuing a GET command to a path (URL), such as an IP address and a location at that address, which may for example be represented as [::1]/a/s/7/s.

Within a predefined timeout period, a response should be sent back containing all version information of the software running on the target, i.e., the lighting-control processor.

The response may be in this specific example:
{"b1mj":0,"b1mn":0,"b2mj":1,"b2mn":0,"kmj":0, "kmn":0,"amj":2,"amn":5,"1 2nc":"442240875962"}

The values for "amj", meaning "application version major" and "amn", meaning application version minor form the requested exchange monitoring information.

The lighting-control processor 100 further comprises a reset unit 106. The reset unit 106 is configured to receive a soft-reset command and to cause a soft reset of the lighting-control processor upon receiving the soft-reset command. The soft reset is an initialization of certain parts of the lighting-control processor under maintained provision of supply power to the lighting-control processor and any attached device. In some embodiments, depending on the information or error received by the exchange watchdog unit the soft reset may only reset specific components in the lighting control processor or the entire lighting-control processor. In other embodiments, a soft reset includes an initialization of certain registers of the lighting-control processor 100, but does not include erasing program code from a working memory of the lighting-control processor 100. The soft reset may include resetting registers such as a program counter, which is sometimes also called instruction counter. In one embodiment, the soft reset includes resetting an execution of program code for implementing one or more functionalities of the exchange control unit 102. In another embodiment, the soft reset includes resetting an execution of program code for implementing one or more functionalities of the interface unit 104. Another type of soft reset includes resetting both, the exchange control unit 102 and the interface unit 104.

The lighting-control processor further comprises an exchange watchdog unit 108. The exchange watchdog unit 108 is configured to receive the exchange monitoring information provided by the exchange monitoring unit 102. The exchange watchdog unit 108 is further configured to determine validity of the received exchange monitoring information in accordance with a predefined validity criterion. Furthermore, the exchange watchdog unit 108 is configured to provide the soft-reset command upon detecting that the received exchange monitoring information is not valid in accordance with the validity criterion.

Determining the validity of the received exchange monitoring information in accordance with a predefined validity criterion can be implemented in different forms, depending on the monitoring information under consideration. It may involve comparing received monitoring information with prestored sample monitoring information. For instance, in the given example of monitoring information that includes version information of the exchange protocol, the received version information is checked against stored values of the parameters "amj" (application version major) and "amn" (application version minor). In case the received information differs from the stored values, the exchange watchdog unit 108 causes a soft reset.

In one variant, in case a response is not provided from the exchange control unit 102 within a defined time span, the exchange watchdog unit 108 causes a soft reset, which is accomplished for instance by entering an infinite loop.

The defined time span is in some embodiments of the exchange watchdog unit 108 related to a timing of a watchdog trigger signal. In such embodiments, the exchange watchdog unit 108 is further configured to provide a watchdog trigger signal. This may be considered as a form of "kicking" an attached peripheral device such as a lighting unit by letting the exchange control unit collect and provide the exchange monitoring information related to the exchange of lighting-control information with the peripheral device The exchange control unit 102 is configured to receive the exchange watchdog trigger signal and to generate and provide the exchange monitoring information in response to receiving the exchange watchdog trigger signal. The watchdog trigger signal may be provided at regularly spaced time intervals, for instance once every second.

In some variants of such embodiments, the exchange watchdog unit 108 is configured to perform a defined number of retries in terms of repetition of the watchdog trigger signal, and cause the soft reset after lapse of the defined number of retries without receiving a correct response, or in absence of any response at all within this number of retries. In one suitable example, the defined number of retries is 5.

It should be noted that the exchange watchdog unit is different from internal watchdog tasks provided by microcontrollers known in the art. Internal watchdog peripherals provided by microcontrollers known in the art basically form a timer that will trigger a reboot upon expiration. When resetting the timer from the software regularly, one can prevent expiration of the timer and therefore prevent the microcontroller from rebooting. This done in order to prevent hang-ups that will block any further execution, without being able to recover. For as soon as such a hang-up would occur, the timer could not be reset and thus would expire, again triggering a reset.

In contrast, the exchange watchdog unit implements a separate task that will conditionally reset the timer, depending on validity of the exchange monitoring information. For example a successful message transmission or correct reception of a reply from another device may form valid exchange monitoring information. Therefore, since if the software is still running but commands are not sent and received, it is now possible to detect and handle issues that are present for instance in an IP stack. On the other hand, the watchdog unit can cause an additional internal watchdog peripheral to refrain from resetting the timer, thus essentially triggering a reboot, if necessary.

Thus, by autonomously checking the correct operation of the exchange between the lighting-control processor and the external lighting unit, correct operation of the lighting unit (or at least a big part of it) can be assessed. By performing a soft reset triggered by the exchange watchdog unit 108 all connected devices including any sensors remain powered. This means they can maintain any volatile content.

Furthermore, it is not anymore required to provide a reset button on a luminaire containing the lighting control processor or on a lighting control device containing the lighting control processor.

The lighting-control processor is in some embodiments combined with other units such as a power-supply unit to form a lighting-control device. In further embodiments, such a lighting-control device is designed to be a stand-alone device, to which one or more lighting units can be connected by via the lighting-control interface 104.

Figure 2:
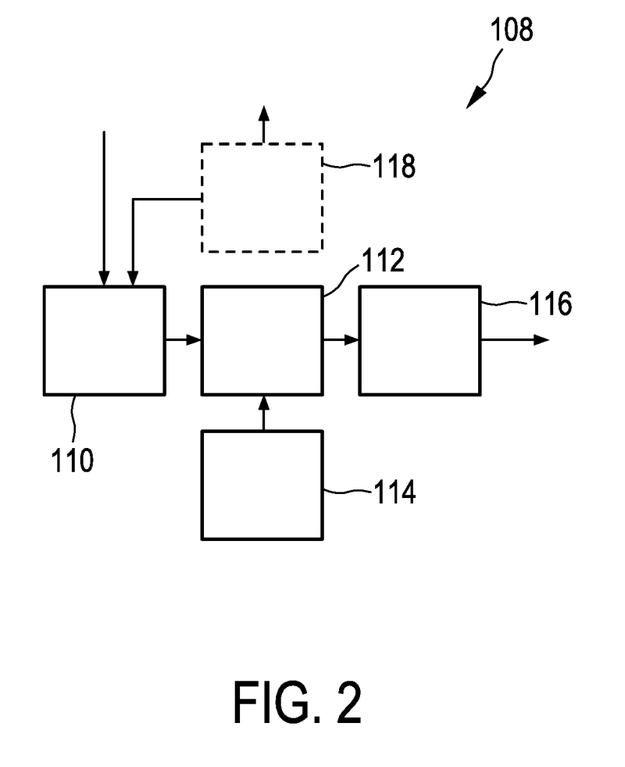
FIG. 2 is a block diagram of the embodiment of the exchange watchdog unit of the lighting-control processor of FIG. 1.

FIG. 2 is a block diagram showing more detail of the embodiment of the exchange watchdog unit 108 for use in the lighting-control processor of FIG. 1. The exchange watchdog unit has a monitoring input 110, through which it receives the exchange monitoring information provided by the exchange control unit in operation of the lighting-control processor. A comparator unit 112 receives the exchange monitoring unit from the monitoring input 110. The comparator unit 112 further receives stored sample monitoring information from a memory 114 for comparison with the currently processed exchange monitoring information. If the currently processed exchange monitoring information agrees with the stored sample monitoring information, the comparator unit considers the currently processed exchange monitoring information as valid. A finding of non-validity the currently processed exchange monitoring information is signaled to a reset-trigger unit 116, which in turn generates and provides a soft-reset command at its output for reception by the reset unit 104 of the lighting-control processor (see FIG. 1).

FIG. 2 also covers a further embodiment of the exchange watchdog unit 108, which additionally includes a watchdog trigger unit 118. The watchdog trigger unit 117 is configured to provide a watchdog trigger signal to the exchange control unit. The watchdog trigger signal serves to trigger the exchange control unit to generate and provide the exchange monitoring information in response to receiving the exchange watchdog trigger signal. The generate trigger is at the same time provided internally to the input unit to trigger the start of a predefined response timeout time span. The input unit stops waiting for a response to the watchdog trigger signal at the end of the response timeout time span has lapsed. In absence of received exchange monitoring information after lapse of the response timeout time span, measured from providing the exchange watchdog trigger signal, the comparator unit reset-trigger unit 116 provides the soft-reset command. In an alternative variant, the soft-reset command is provided only after a predefined number of repetitions of the cycle of sending the watchdog trigger signal and waiting for a response without receiving it.

Figure 3:
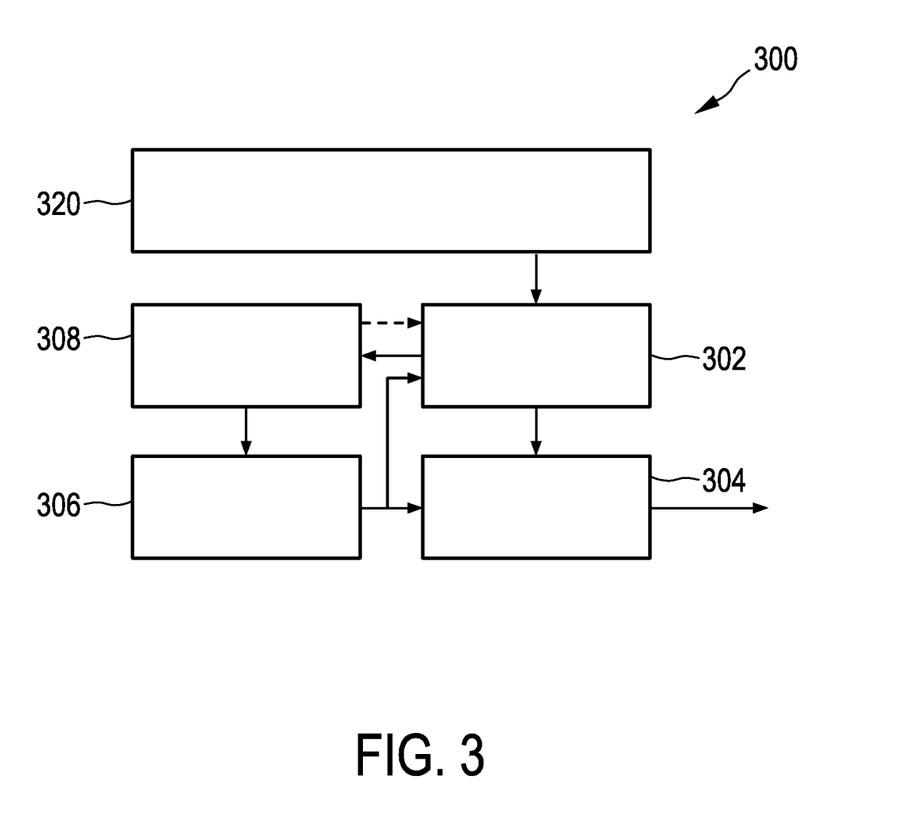
FIG. 3 is a block diagram of a second embodiment of a lighting-control processor.

FIG. 3 is a block diagram of a second embodiment of a lighting-control processor. The lighting-control processor of FIG. 3 resembles that of FIG. 1 in many of its features and functionalities. For that reason, reference labels are used in FIG. 3 for respective functional units, which are identical to those reference labels used for corresponding units in the lighting-control processor of FIG. 1, except for a leading digit "3" in the reference labels of FIG. 3 instead of a "1" used in FIG. 1. Reference is also made to the description of FIG. 1 for details of structure and functionality of these units. In particular, the lighting-control processor 300 has an exchange control unit 302, a lighting-control interface 304, a reset unit 306 and an exchange watchdog unit 308. In addition, the lighting-control processor 300 additionally integrates a lighting-control unit 320. The lighting-control unit 320 serves for generating lighting-control commands and processing control information and requests received from the external lighting unit (not shown in FIG. 3).

Figure 4:
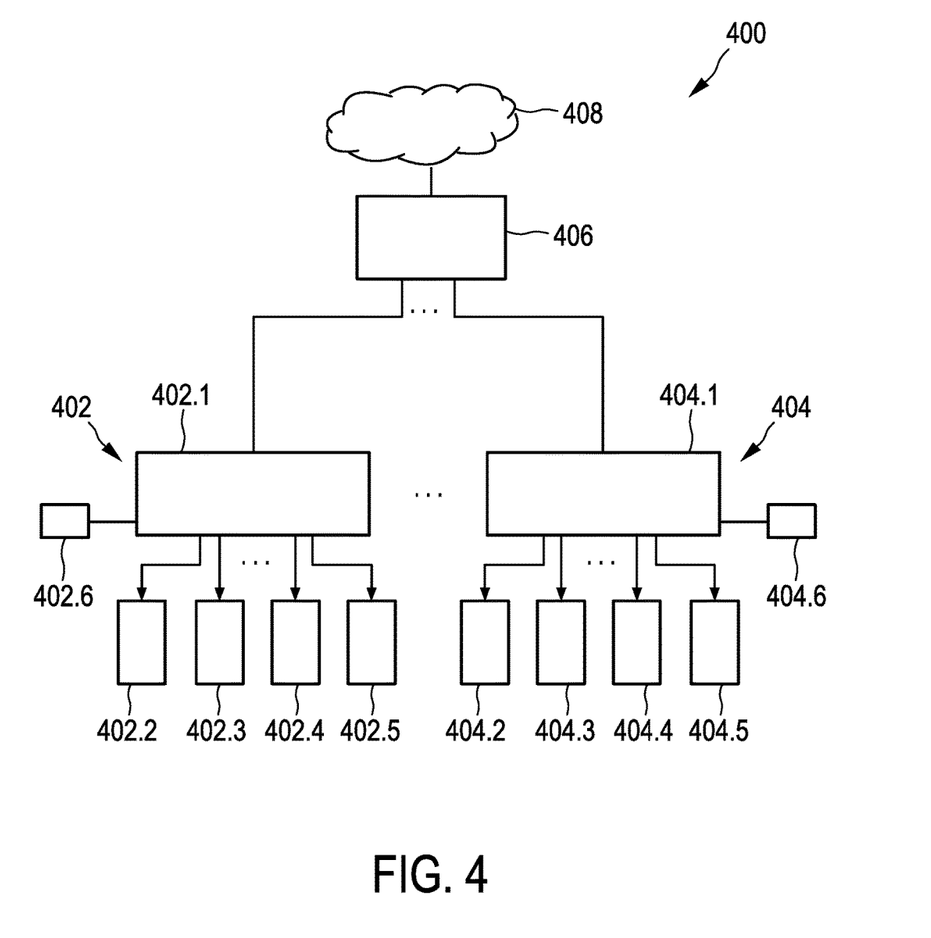
FIG. 4 is a block diagram of an embodiment of an arrangement of embodiments of luminaires and a gateway server in a lighting system.

FIG. 4 is a schematic block diagram of an embodiment of an arrangement of embodiments of luminaires and a gateway server in a lighting system 400. The lighting system comprises a number of luminaires, two of which are shown under reference labels 402 and 404. The luminaire 402 comprises a first lighting-control processor 402.1. The lighting-control processor is connected with a number of luminaires, four of which are shown under reference labels 402.2 to 402.5, and with a sensor shown under the reference label 402.6. Similarly, the luminaire 404 comprises a first lighting-control processor 404.1. The lighting-control processor 404.1 is connected with a number of luminaires, four of which are shown under reference labels 404.2 to 404.5, and with a sensor 404.6. The luminaires 402 and 404 are in communication exchange with a gateway server 406, which in turn is in communication exchange with a large-area network 408 and thus provides access to and from the luminaires 402 and 404 via the large-area network. In operation, the lighting-control processor of at least one of the luminaires 402 and 404 involves other networked devices such as the gateway server 406 in the exchange watchdog process described above. In other words, the complete IP stack can be verified by receiving gateway exchange monitoring information messages from the gateway server 406. This allows determining an internal failure of the lighting control processor, and can be used to release detect additional failure conditions that only show in communication with external network devices. Form the gateway exchange monitoring information received information indicative of the failure condition observed can be derived. This in turn can be used to manage the respective failure condition.

Figure 5:
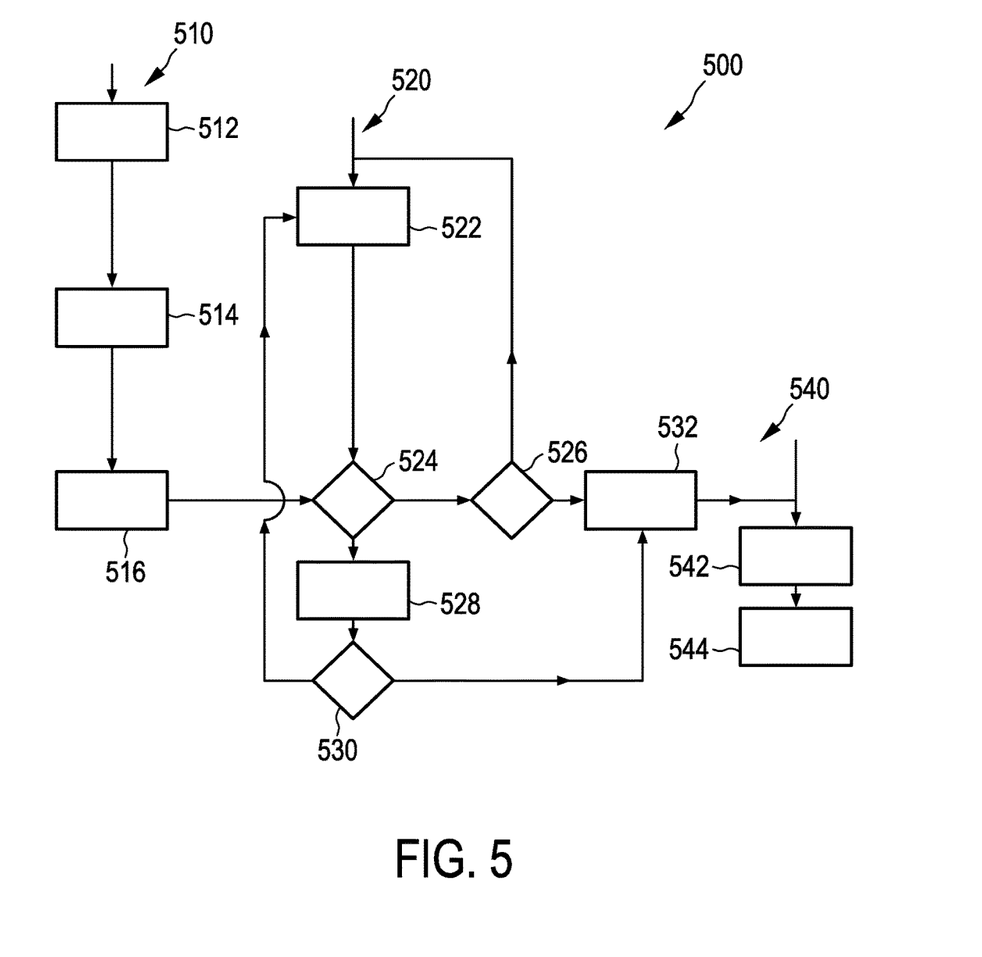
FIG. 5 is an embodiment of a method for controlling operation of a luminaire.

FIG. 5 is an embodiment of a method 500 for controlling operation of an external lighting unit. The method comprises at least in part a parallel operation of three processes, an exchange control process 510, an exchange watchdog process 520 and a reset-control process 540.

The exchange control process 510 comprises a step 512 of controlling exchange of lighting-control information with the lighting unit via a lighting-control interface in accordance with an exchange protocol. Furthermore, in step 514, a watchdog trigger signal is received, followed by generating and providing exchange monitoring information indicative of an operational status of the exchange control unit in response to the watchdog trigger signal (step 516).

The exchange watchdog process 520 comprises providing the watchdog trigger signal in step 522. Step 524 includes checking whether exchange monitoring information has been received as an outcome of the exchange control process 510 described above. If yes, the received exchange monitoring information is checked for validity in steps 528, 530 in accordance with a predefined validity criterion. This is in the present example performed by accessing prestored sample exchange monitoring information in step 528 and comparing it with the received exchange monitoring information in step 530. If agreement is found, the process branches back to providing the next watchdog trigger signal in step 522. In one example, a watchdog trigger signal is provided in regular time spacing, for instance having a time spacing between one and five seconds. In one example the time spacing is one second. If no agreement is found between the prestored sample exchange monitoring information and the received exchange monitoring information in step 530, that is, upon detecting that the received exchange monitoring information is not valid, a soft-reset command is generated in step 532 and provided to the reset control process 540 described further below. The soft-reset command is also generated in case no exchange monitoring information has been received after a predetermined number of repetitions of providing the watchdog trigger signal, as checked in step 526.

The reset control process 540 comprises receiving a soft-reset command in step 542 and causing a soft reset of the lighting-control processor upon receiving the soft-reset command in step 544.

While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A lighting-control processor for controlling operation of an external lighting unit, the lighting-control processor, comprising
   an exchange control unit, which is configured
      to control exchange of lighting-control information with the lighting unit via a lighting-control interface in accordance with an exchange protocol; and
      to generate and provide exchange monitoring information indicative of an operational status of the exchange control unit;
   a reset unit, which is configured to receive a soft-reset command and to cause a soft reset of the lighting-control processor upon receiving the soft-reset command, the soft reset being a reset process under maintained provision of supply power to the lighting control processor and any device connected to the lighting-control processor; and
   an exchange watchdog unit, which is configured to receive the exchange monitoring information, determine validity of the exchange monitoring information in accordance with a predefined validity criterion, and to provide the soft-reset command upon detecting that the received exchange monitoring information is not valid.

2. The lighting-control processor of claim 1, wherein the exchange watchdog unit is configured to determine validity of the received exchange monitoring information by comparing the received exchange monitoring information with predefined template monitoring information, and to provide the soft-reset command if the received exchange monitoring information differs from the template monitoring information.

3. The lighting-control processor of claim 1, wherein the exchange watchdog unit is additionally configured to provide a watchdog trigger signal, and wherein the exchange control unit is configured to receive the exchange watchdog trigger signal and to generate and provide the exchange monitoring information in response to receiving the exchange watchdog trigger signal.

4. The lighting-control processor of claim 3, wherein the exchange watchdog unit is additionally configured to provide the soft-reset command in absence of received exchange monitoring information after lapse of a predefined timeout time span measured from providing the exchange watchdog trigger signal.

5. The lighting-control processor of claim 1, wherein the exchange control unit is configured to control the exchange of the lighting-control information via the lighting-control interface in accordance with an Internet Protocol stack.

6. The lighting-control processor of claim 3, wherein the exchange watchdog unit is further configured to provide the watchdog trigger signal via the lighting-control interface to a gateway server, which is external to the lighting-control processor, and to receive the exchange monitoring information in the form of gateway exchange monitoring information, determine validity of the gateway exchange monitoring information in accordance with a predefined validity criterion, and to provide the soft-reset command upon detecting that the received gateway exchange monitoring information is not valid.

7. A luminaire comprising at least one lighting unit for generating light and a lighting-control processor according to claim 1 for controlling operation of the at least one lighting unit.

8. The luminaire of claim 7, further comprising
   a supply-power unit, which is connected to the lighting-control processor and which is configured to deliver electrical DC supply power to at least one electrical device including the at least one lighting unit via a plug-in power interface; wherein
   the reset unit is configured, when causing the soft reset of the lighting-control processor upon receiving the soft-reset command, to control operation of the supply-power unit so as to keep up delivery of the supply power via the power interface.

9. The luminaire of claim 8, further comprising a sensor unit, which receives the supply power via the power interface and includes a random-access memory that is configured to lose stored information when reception of the supply power is interrupted.

10. The luminaire according to claim 8, wherein the reset unit is additionally configured to receive a hard-reset command and to cause a hard reset of the lighting-control processor upon receiving the hard-reset command, and wherein the luminaire is configured to not receive the hard-reset command and the soft-reset command by external user input.

11. A method for operating a lighting-control processor in controlling operation of an external lighting unit, the method comprising
   an exchange control process, comprising
      controlling exchange of lighting-control information with the lighting unit via a lighting-control interface in accordance with an exchange protocol; and
      generating and providing exchange monitoring information indicative of an operational status of the exchange control unit;
   a reset control process, comprising
      receiving a soft-reset command; and
      causing a soft reset of the lighting-control processor upon receiving the soft-reset command, the soft reset being a reset process under maintained provision of supply power to the lighting control processor and any device connected to the lighting-control processor; and
   an exchange watchdog process, comprising
      receiving the exchange monitoring information;
      determining validity of the exchange monitoring information in accordance with a predefined validity criterion; and
      providing the soft-reset command to the reset control process upon detecting that the received exchange monitoring information is not valid.

12. The method of claim 11, wherein
   the exchange watchdog process further comprises providing a watchdog trigger signal to the exchange control process; and wherein
   the exchange control processes further comprises receiving the exchange watchdog trigger signal and, in response to receiving the exchange watchdog trigger signal, providing the exchange monitoring information.

13. A method for controlling operation of a luminaire, comprising providing a luminaire comprising at least one lighting unit for generating light and a lighting-control processor for controlling operation of the at least one lighting unit; and the lighting-control processor controlling operation of the lighting unit of the luminaire in accordance with the method of claim 11.

14. The method of claim 13, further comprising delivering electrical DC supply power from a supply-power unit, which is connected to the lighting-control processor, to at least one electrical device including the at least one lighting unit via a plug-in power interface; and when causing the soft reset of the lighting-control processor upon receiving the soft-reset command, controlling operation of the supply-power unit so as to keep up delivery of the supply power via the power interface.

15. A computer program for controlling a lighting-control processor in controlling operation of an external lighting unit, the computer program comprising program code for causing the lighting-control processor to carry out the method as defined in claim 11, when the computer program is run on the lighting-control processor.

\* \* \* \* \*